United States Patent
De Jong et al.

(10) Patent No.: US 8,207,945 B2
(45) Date of Patent: Jun. 26, 2012

(54) IMAGE DISPLAY THAT MOVES PHYSICAL OBJECTS AND CAUSES TACTILE SENSATION

(75) Inventors: Nicolas De Jong, Veldhoven (NL); Elmo Marcus Attila Diederiks, Eindhoven (NL); Murray Fulton Gillies, Eindhoven (NL); Jurgen Jean Louis Hoppenbrouwers, Eindhoven (NL); Johannes Henricus Maria Korst, Eindhoven (NL); Thomas Caspar Kraan, Eindhoven (NL); Rogier Winters, Weert (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 956 days.

(21) Appl. No.: 11/719,996

(22) PCT Filed: Nov. 30, 2005

(86) PCT No.: PCT/IB2005/053990
§ 371 (c)(1),
(2), (4) Date: Mar. 7, 2008

(87) PCT Pub. No.: WO2006/059298
PCT Pub. Date: Jun. 8, 2006

(65) Prior Publication Data
US 2008/0252607 A1    Oct. 16, 2008

Related U.S. Application Data

(60) Provisional application No. 60/632,133, filed on Dec. 1, 2004.

(51) Int. Cl.
*G06F 3/041* (2006.01)
*H04B 3/36* (2006.01)

(52) U.S. Cl. .................. 345/173; 178/18.01; 345/156; 340/407.1

(58) Field of Classification Search .......... 345/173–178, 345/156; 178/18.01–18.11; 340/407.01, 340/407.02
See application file for complete search history.

(56) References Cited

U.S. PATENT DOCUMENTS

| | | | | |
|---|---|---|---|---|
| 5,709,219 A | * | 1/1998 | Chen et al. | 600/595 |
| 5,717,423 A | * | 2/1998 | Parker | 345/108 |
| 5,977,867 A | | 11/1999 | Blouin | |
| 5,979,892 A | * | 11/1999 | Smith | 271/267 |
| 6,636,202 B2 | * | 10/2003 | Ishmael et al. | 345/173 |

(Continued)

FOREIGN PATENT DOCUMENTS
DE    20110769 U1    11/2001
(Continued)

*Primary Examiner* — Bipin Shalwala
*Assistant Examiner* — Steven Holton

(57) ABSTRACT

An image display including a touch-sensitive display, that creates tactile sensation and movement of an object (3-2) along its surface is provided. Actuators including conductive rods (4-111, 4-112) attached together may be used, such that each rod of the actuator (4-11) may increase or decrease in size when current is applied to that rod to cause the actuator to bend toward a specified direction. Also, an image display that includes ball bearings (1-10) whose rotation is controlled by driving magnets (1-21, 1-22) to cause an object to move is provided. Further, air holes (3-11) tilted in various directions to control object movement by air pressure may be provided. Moreover, rods (3-10) may be moved up or down as activated by driving magnets (2-20). The actuators, rods, ball bearing assemblies, or holes may provide touch sensitivity for the image display.

7 Claims, 4 Drawing Sheets

U.S. PATENT DOCUMENTS

| | | |
|---|---|---|
| 6,636,203 B1 | 10/2003 | Wong et al. |
| 6,693,516 B1 * | 2/2004 | Hayward .................. 340/407.1 |
| 7,077,015 B2 * | 7/2006 | Hayward et al. ......... 73/862.041 |
| 7,138,985 B2 * | 11/2006 | Nakajima .................... 345/173 |
| 7,190,352 B2 * | 3/2007 | Ling et al. .................... 345/173 |
| 7,196,688 B2 * | 3/2007 | Schena ........................ 345/156 |
| 2002/0109668 A1 | 8/2002 | Rosenberg et al. |
| 2002/0158836 A1 | 10/2002 | Ishmael, Jr. et al. |
| 2003/0038776 A1 | 2/2003 | Rosenberg et al. |
| 2003/0179190 A1 | 9/2003 | Franzen |
| 2003/0184574 A1 | 10/2003 | Phillips et al. |

FOREIGN PATENT DOCUMENTS

| | | |
|---|---|---|
| EP | 1293950 A1 | 2/2003 |
| JP | 11203020 A | 7/1999 |
| WO | 0180284 A2 | 10/2001 |
| WO | 0191100 A1 | 11/2001 |
| WO | 2004036405 A | 4/2004 |
| WO | 2004081776 A1 | 9/2004 |

* cited by examiner

IMAGE DISPLAY THAT MOVES PHYSICAL OBJECTS AND CAUSES TACTILE SENSATION

This invention relates to the field of image displays, and to displays that that can move or control physical objects at a surface of the display and that provide tactile sensation and feedback.

There are certain situations where it is required that physical objects at or near the surface of an image display be moved. Typically, such movement would be required within the bounds of the surface of the display.

Further, high precision moving forces may be useful as feedback for a user in a touch-sensitive image display, such as a computer-game control, and can be position related. Thus, the user could "feel" the grains in the wood of the displayed plank displayed on the image display.

Devices are known that provide tactile feedback to a user. For example, Franzen, U.S. Patent Application No. 2003/0179190, discloses a touch sensitive display that provides tactile feedback based on pins that move and down, the pins covered by a contact medium. However, the cited reference does not have the ability to move objects in a direction along the surface of the display and cannot give a finger that touches it the sensation of movement and texture.

Provided are a method, system, device, and apparatus that embodies or carries out the functions of image display system provided.

According to an embodiment of the present invention, provided is an image display including a set of actuators, each actuator including conductive rods attached together, such that each rod of the actuator may increase or decrease in size when current is applied to that rod to cause the actuator to bend toward a specified direction according to a received movement signal. Further, an object at a surface of the image display may be moved in the specified direction.

The rods may be made of piezo-electric ceramics or conductive polymers or a combination of these or other materials.

The actuator may be arranged between pixels of the image display. Such an image display may provide a haptic sensation or a motion of an object at the surface of the image display.

Moreover, the actuator may be made of three rods arranged such that responsive to application of a current to the rods, the actuator bends toward one of four or more specifiable directions.

The image display may be a touch sensitive display. The actuators may provide the touch sensitivity for the image display.

Also, an image display that can move an object near a surface of the image display is described. The image display includes a ball bearing assembly including a ball bearings that is arranged such that a rotation direction of the ball bearing may be controlled by magnets, to cause an object at a surface of the image display to be moved in a specified direction by the movement of the ball bearing along a rotation direction of the ball bearing.

The ball bearing may be arranged between pixels of the image display. The image display may be a touch sensitive image display. The ball bearings may provide the touch sensitivity for the image display.

Further, an image display that provides a motion of an object at the surface of said image display is provided. There is a hole layer that includes air holes. The air hole is tilted at an oblique angle with respect to the surface in one of four directions, such that air blown through the air hole creates directed air pressure at the surface in the direction toward which the hole is tilted. The air hole may be selectively opened and closed according to a movement signal received for moving an object at a surface of the image display in the direction of the directed air pressure.

Moreover, a control layer may be provided that has row electrodes and column electrodes, and a foil arranged such that the foil closes the hole responsive to an electric current passed through a row of electrodes.

There may be sets of four such air holes, such that each hole of the set may be located at a corner of an imaginary figure resembling a rectangle with no intervening holes as viewed from the surface, wherein each hole of the set of four holes is tilted in one of the four directions.

Further, an air inlet channel between holes may be formed. The holes may be arranged between pixels of the image display. The image display may be a touch sensitive image display.

Also described is an image display configured to cause a haptic sensation at a surface of the image display. Such an image display includes a pixel-actuator matrix including rods and a set of magnets arranged to be activated for a first activation by a first movement signal received and to be activated for a second activation by a second movement signal received. A rod may be arranged to move to an extended position with respect to the surface of the image display responsive to the first activation, and to move to a retracted position with respect to the surface of the image display responsive to the second activation, such that the haptic sensation is caused at the surface by the rod in the extended position. It may be formed such that at most one rod is provided between pixels. The image display may be a touch sensitive image display. The rods may provide the touch sensitivity for the image display.

Figure 1:
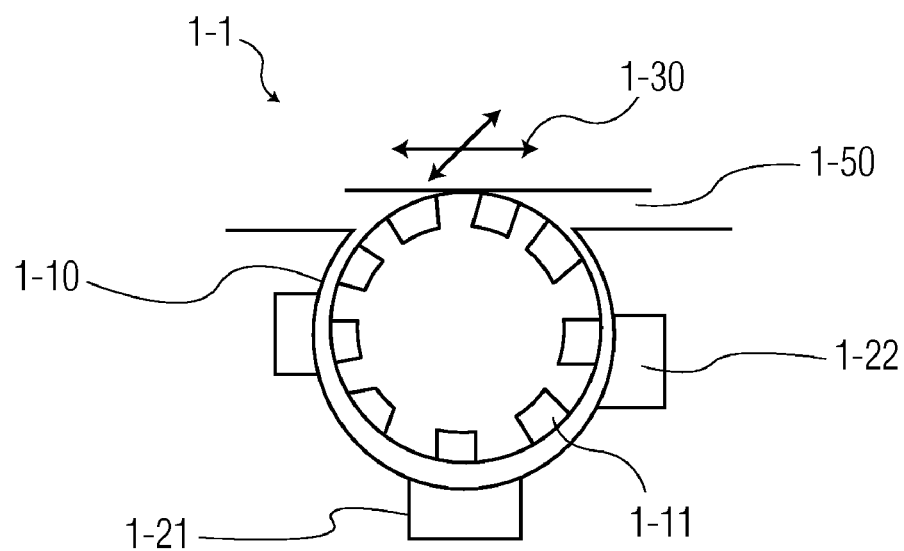
FIG. 1 is a schematic view of a ball bearing assembly of an image display system according to a first embodiment of the present invention.

The following discussion and the foregoing figures describe embodiments of Applicant's invention as best understood presently by the inventors however, it will be appreciated that numerous modifications of the invention are possible and that the invention may be embodied in other forms and practiced in other ways without departing from the spirit of the invention. Further, features of embodiments described may be omitted, combined selectively or as a whole with other embodiments, or used to replace features of other embodiments, or parts thereof, without departing from the spirit of the invention. The figures and the detailed description are therefore to be considered as an illustrative explanation of aspects of the invention, but should not be construed to limit the scope of the invention.

An apparatus according to this invention may compromise a substantially flat display that is oriented vertically or horizontally. The display has the added ability to dynamically exert a force or a sensation on objects that are placed on the display. This force can be used to move objects or create a specific texture, which fingers that touch the display can feel.

For example, a table may have a physically integrated image display according to the present invention, or the image display may be connected to the table or resting on the table. The image display may also be designed as horizontal screen with legs and further, may resemble a table or have function similar table, for example, when the image display is inactive or on portions of the surface without the image display. The image display may have the functionality of a touch-screen that can display a game board, such as a chessboard, upon which real chess pieces can be placed. The touch-screen of the display would then be able to sense what pieces are at what positions, by for example, if every piece had a slightly different bottom profile, so that the imprint is slightly different. The user can then have the experience of playing chess against a computer opponent. To keep the experience complete, the display may be able to move the chess pieces of the computer opponent as well, as described below. It will be understood that the present invention is also suitable for many other types of games, including games that require the motion of pieces such as those used in checkers, backgammon, scrabble, rumicubes, game tiles, cards, or the like.

A second example is where the display gives the user feedback when the screen is touched. For example, when pressing displayed "buttons" on the screen or on a virtual keyboard or keypad displayed on the screen. Such haptic feedback can also be content related. For example, a displayed lake could actually ripple when touched. Here the user's finger would be "moved;" the user would feel a force or a raised surface when the user pressed one or more finger on the display.

It will be understood that a touch-screen is not necessary for all embodiments of the present invention. Further, the display may be implemented as any kind of monitor, screen or display, including, for example, a CRT, an LCD, an LED, a plasma, a rear projection or front projection display or any other kind of flat or other type of screen or display suitable for performing in accordance with one or more embodiments of the present invention.

EMBODIMENT 1

A first embodiment of the present invention is shown in a cross-sectional view by FIG. 1. A ball bearing 1-10 of a bearing ball assembly 1-1 is powered magnetically to rotate, and thereby move in a two-dimensional direction 1-30 an object (shown in FIG. 3E as object 3-2) at or near a surface 1-50 of the image display.

An activation of a driving magnet 1-21, 1-22 is controlled by a control signal. According to an embodiment of the present invention, a set of driving magnets 1-21, 1-22, et cetera may be arranged. For example, FIG. 1 shows a set of three driving magnets, including driving magnets 1-21, 1-22, however, two or more additional driving magnets (not shown) could be provided "in front of" and "behind" the ball bearing 1-10. In such an arrangement, activation of two or more driving magnets would cause rotation of the ball bearing 1-10 along either axes shown by the two-dimensional direction 1-30, or along a vector that has components in both axes. Such ball bearing assemblies could be made small and arranged between pixels of the image display. According to an aspect of the present embodiment, ball bearing assemblies would not be included between every pair of adjacent pixels.

According to an embodiment of the present invention, ball bearing 1-10 has smaller magnets 1-11 arranged near a periphery thereof to improve control of the ball bearing 1-10. It will be understood that the ball bearing 1-10 does not necessarily have to be a solid body. Further, while a ball bearing 1-10 is described, the present embodiment could also work with other types of substantially spherical bodies instead of or in addition to ball bearings. According to an aspect of the present embodiment, the ball bearing 1-10 used would have to be relatively small to be able to provide the maneuverability necessary to perform according to the present invention.

Accordingly, when for example, an object such as a chess piece requires movement, the control signal activated driving magnet 1-21, 1-22, would rotate the ball bearing 1-10 in a specified direction 1-30 along the surface 1-50 of the image display, causing the motion of the object along with the rotation of ball bearing 1-10 in the specified direction.

Further, it will be appreciated that longer motions of objects at the surface could be achieved by serial activation of ball bearings. For example, a time-delayed activation of adjacent ball bearings rotating in a similar direction would cause the object to experience continuous force, causing a longer movement. Also, the amount of electricity applied to magnetize the driving magnets 1-21, 1-22 could also be controlled, based on the type of application (for example type of object to be moved: in chess for example, there are smaller and larger pieces), and the desired speed of the motion. Fine control over the timing of the activation sequence of the ball bearings could then effect acceleration, deceleration and speed control of the object near the surface.

More than one ball bearing 1-11 may be activated at any one time and several ball bearings in any one area of the image display could be used to move an object. Also, activation of ball bearings in various sequences could cause movement of the object in directions other than due east, due south, due west or due north. Similarly, an object trajectory resembling a curve or other shape could be achieved by a precise series of ball bearing 1-11 activations.

EMBODIMENT 2

Figure 2:
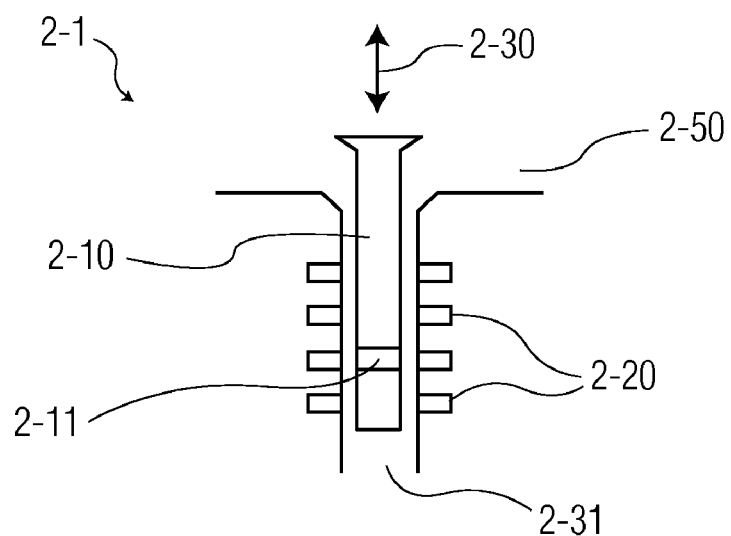
FIG. 2 is a schematic view of a rod assembly of an image display system according to a second embodiment of the present invention.

A second embodiment of the present invention is shown in a cross-sectional view by FIG. 2. A rod 2-10 can be made to move up and down depending the activation of one or more driving coils 2-20 or the like to become magnetic. The driving coils 2-20, when magnetized act on the rod 2-10 or a magnet 2-11 (or a set of magnets) in the rod 2-10. It is to be understood that while described as driving coils, many types of magnetic materials and shapes may be used.

When higher driving coils are activated, the rod 2-10 moves up to an extended position with respect to the surface 2-50 of the image display. A space 2-31 may be provided underneath the rod 2-10 to allow for a retracted position of the rod 2-10.

Rod 2-10 may be placed between pixels (not shown) of the image display. According to an aspect of the present embodiment, such rods would be required between each pixel of the image display to provide a fine tactile resolution, however this may not be necessary for all implementations of the present invention.

EMBODIMENT 3

Figure 3A:
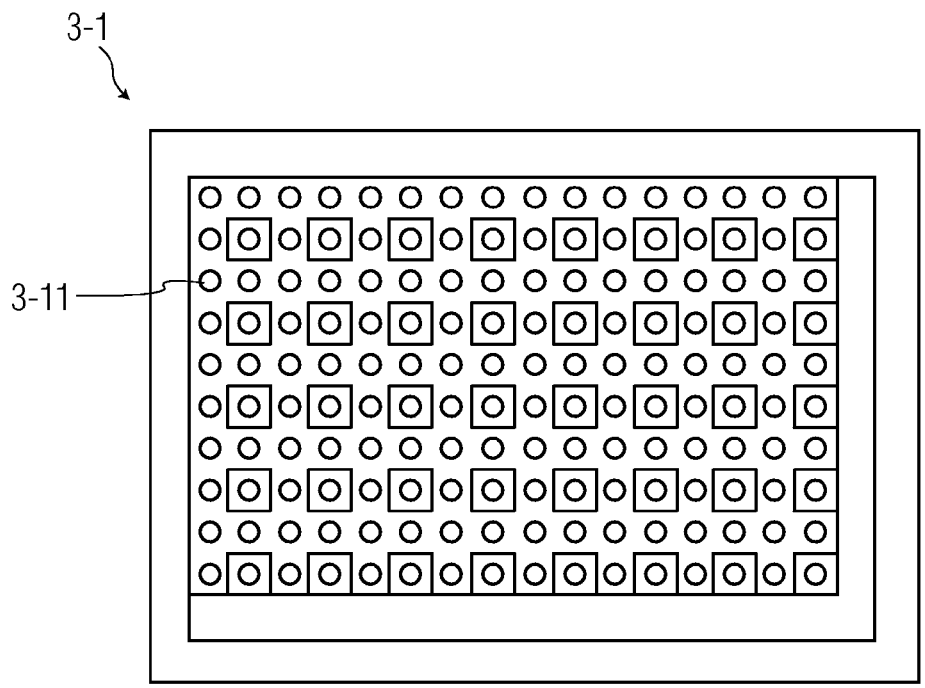
FIG. 3A is schematic view of an image display system according to a third embodiment of the present invention.
Figure 3B:
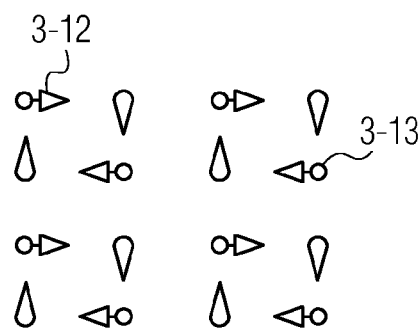
FIG. 3B is a schematic view of air pressure directions from air holes of an image display system according to the third embodiment of the present invention.

A third embodiment of the present invention is shown by FIGS. 3A-3E. A view of the image display 3-1 with air holes is shown by FIG. 3A. Small holes in the image display are situated between the pixels (not shown). The holes are formed at a slight angle or tilt, such that air that is blown out of one or more of such tilted air holes 3-12, 3-13, causes the object 3-2 at, near or on the surface to be blown in a specified direction of movement 3-32. The image display is viewed in FIG. 3A from above, if the image display 3-1 is arranged horizontally, or from the front, if the image display is arranged vertically.

Air may be blown in four directions based on the tilt orientation of air hole 3-11 that is active in blowing air. At any one time only a few of the holes may be opened, as controlled by a motion signal, in order to control the motion of one or more objects at the surface of the image display 3-1.

A front plate 3-71 of the image display is equipped with holes that are formed at an angle (facing north, south, east and west). For example, hole 3-11 of FIG. 3D is tilted toward the west, from the point of view of the page that contains the figure. West hole 3-12 of FIG. 3B also is tilted west and shows a direction of air blown out through such a hole, while east hole 3-13 is tilted east and shows a direction of air blown out through such a hole.

Figure 3C:
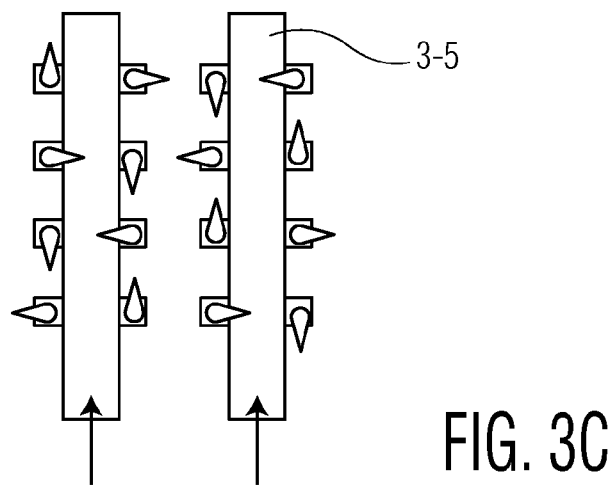
FIG. 3C is a schematic view of an air intake channel of an image display system according to the third embodiment of the present invention.
Figure 3D:
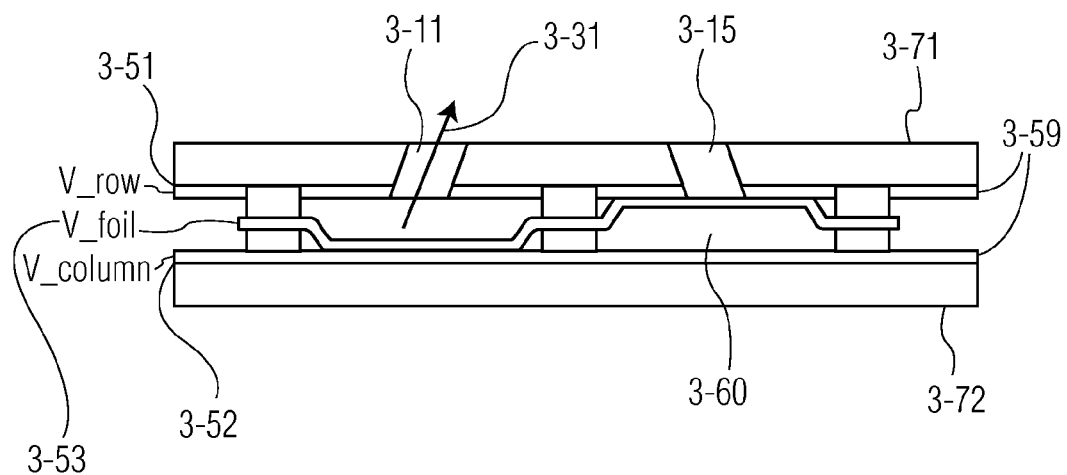
FIG. 3D is a cross-section view of an air pressure control system of an image display system according to the third embodiment of the present invention.
Figure 3E:
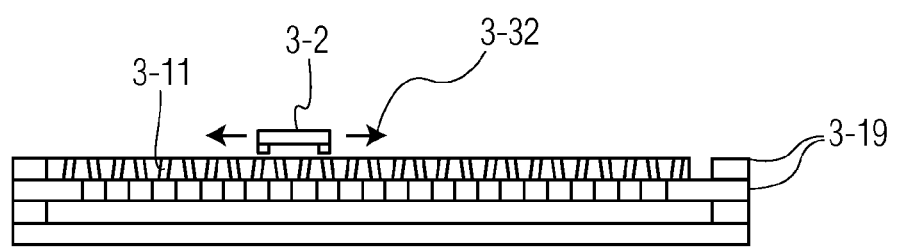
FIG. 3E is a cross-section view of top layers of an image display system according to the third embodiment of the present invention.

A motion of an object 3-2 of FIG. 3E would be determined by the tilt orientation of the holes that are active in blowing air. More than one hole 3-11 may be activated at any one time and several holes in any one area of the image display could be used to move the object 3-2. Also, activation of holes of different tilt orientations in the area of the object 3-2 could be made use of to cause object 3-2 movement that is not due east, due south, due west or due north. For example, activation of one or more holes with north tilt orientation in the area south of the object 3-2 simultaneously with activation of one or more holes with west tilt orientation in the area east of the object 3-2 could be used to cause object 3-2 motions in a north-west direction. Similarly, an object 3-2 trajectory resembling a curve or other shape could be achieved by a precise series of hole 3-11 activations.

According to an aspect of the present embodiment, holes may be arranged in sets of four, such that each hole of the set of four holes is located at a corner of an imaginary rectangle figure. Accordingly, each hole of the set of four holes could be tilted in a different direction than the remaining holes of the set.

Further, it will be appreciated that longer motions of object 3-2 could be achieved by serial activation of holes. For example, a time-delayed activation of adjacent similarly tilted air holes would cause the object 3-2 to experience continuous air pressure from behind, causing a longer movement. Also, the amount of air pressure applied through air hole 3-11 could also be controlled, based on the type of application (for example type of object to be moved: in chess for example, there are smaller and larger pieces), and the desired speed of the motion. Fine control over the timing of the activation sequence of the air holes could then effect acceleration, deceleration and speed control of the object.

According to an aspect of the invention, control of the airflow through the air holes may be achieved by using a control layer 3-59 including row-electrodes 3-51 arranged on the front plate 3-71 and column-electrodes 3-52 arranged on the back-plate 3-72. It will be appreciated that this arrangement could be reversed. A foil 3-53 is disposed between the front plate 3-71 and the back plate 3-52. While described as a foil, it will be appreciated that many types of conductive media could be used instead of a foil, or in combination with a foil. The foil 3-53 may be a conductive sheet, or a sheet electrode could be arranged on or in the entire foil.

When the voltage-difference between row-electrode 3-51 and the foil 3-53 is sufficiently high, the foil will be pulled towards the front-plate along the row-electrode and thereby close the air hole 3-11. When the voltage-difference between the column electrode 3-52 and the foil 3-53 is sufficiently high, the foil will be pulled toward the back plate along the column electrode and thereby open the hole. Thus, the holes can be selectively opened and closed with passive matrix addressing.

According to an aspect of the present embodiment, as shown by FIG. 3C, an inlet channel 3-5 or several inlet channels or holes may be formed between the air holes to create a pressure in a space 3-60 between the front plate and the back plate that is higher than the air pressure at or near the surface. By selectively opening air holes the airflow can be used to move the object 3-2. It will be understood that according to an aspect of the present embodiment, control over the motion of object 3-2 along the surface is consistent with the hovercraft-principle.

EMBODIMENT 4

Figure 4A:
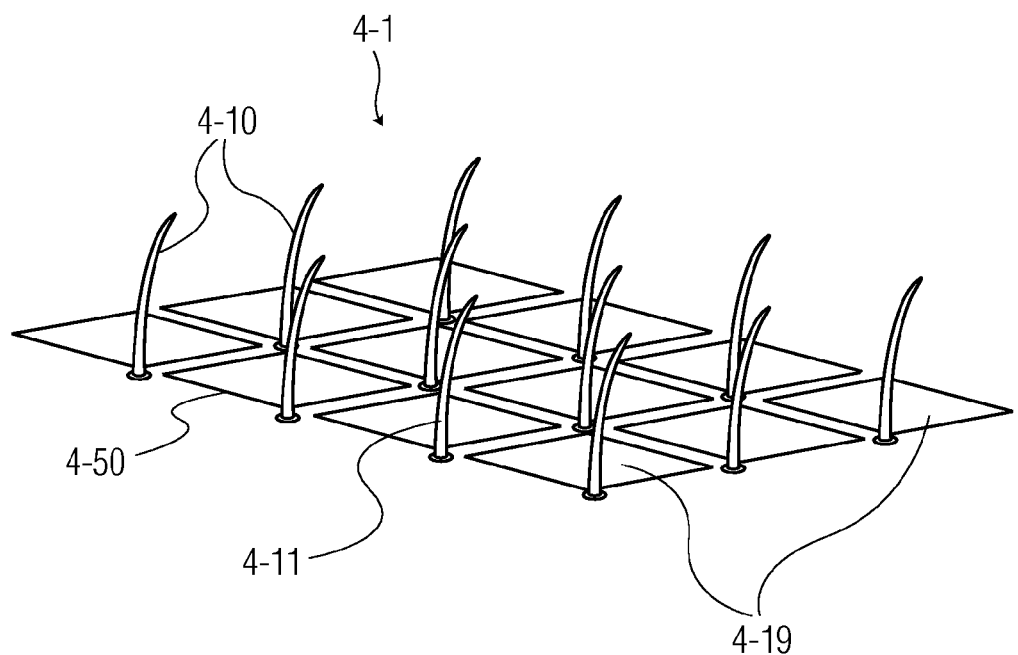
FIG. 4A is a perspective view of an image display according to the fourth embodiment of the present invention.
Figure 4B:
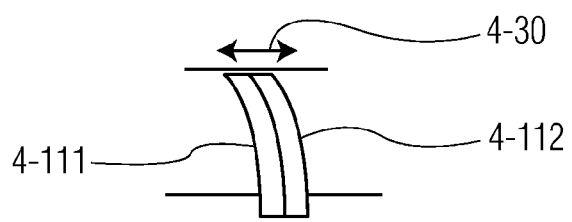
FIGS. 4B and 4C are schematic views of an actuator of an image display according to the fourth embodiment of the present invention.
Figure 4C:
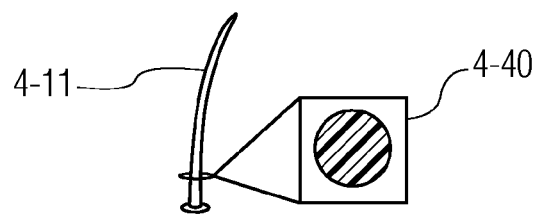

A fourth embodiment of the present invention is shown by FIGS. 4A-4C. In the fourth embodiment, a pixel-actuator matrix 4-19 includes actuators 4-10 made up of a set of rods, rods 4-111 and 4-112 or tubes that consist of material that can grow and shrink depending on the voltage applied to them. As shown by FIG. 4B, the left rod 4-111 and the right rod 4-112, are two rods attached together, such that the right rod 4-112 is slightly larger because of a small current placed on it.

According to an aspect of the present embodiment, a dielectric film may be used to provide a degree of electric insulation between the left rod 4-111 and the right rod 4-112, or the left rod 4-111 and the right rod 4-112 may be made of different materials to achieve different growth characteristics due to the application of electric current. By varying the current applied to each of the left rod 4-111 and the right rod 4-112, or by using different materials for left rod 4-111 and the right rod 4-112, the actuator 4-11 can flex in each direction in a 1-dimensional plane. According to an aspect of the present embodiment, an actuator may tilt only in one direction, in which case a set of differently tilting actuators would be arranged in an adjacent fashion.

According to an aspect of the present embodiment, a third rod is added to the actuator 4-11, so that two-dimensional movement of the tip of the actuator 4-11 may be accomplished. Such additional rods may further be added to achieve finer control over the direction of the tilt of the actuator in two-dimensions, or even in three-dimensions, because the degree to which the tip of the actuator bends and its direction is controlled by the current supplied to the rods. For example, three rods may be sufficient for each actuator 4-10 to control movement in at least four directions. A cross section view of actuator 4-11 is shows as 4-40 of FIG. 4C.

According to an aspect of the present embodiment, the rods of the actuators 4-10 are formed of polymers. An image display could be a polymer LED display. Further, piezoelectric ceramics may be used for the actuators 4-10. Piezoelectric ceramics are used in STM (Scanning Tunnel Microscope) devices for nanometer precise movement. It will be understood that various combinations of materials could be used for the rods of the actuators 4-10 and that different materials could be used for different actuators 4-10 of the image display 4-1.

The activation of the actuators 4-10 may be controlled in a manner similar to the passive matrix addressing described with reference to the third embodiment. Column-electrodes and row-electrodes may be deployed to control an individual actuator 4-11.

According to an aspect of the present embodiment, the actuators 4-10 may be placed between pixels of the image display 4-1. Also, an actuator 4-11 may be arranged between every pixel 4-50, as shown in FIG. 4A. By movement of the actuators 4-10, a motion of an object can be achieved in the direction of the tilt of the actuators 4-10.

Further, it will be appreciated that longer motions of an object along the surface of the image display 4-1 could be achieved by serial activation of actuators 4-10. More than one actuator 4-11 may be activated at any one time and several actuators 4-10 in any one area of the image display 4-1 could be used to move an object. For example, a time-delayed activation of adjacent actuators toward a similar tilt would cause the object to experience continuous pushing from behind, causing a longer movement. Also, the amount of current applied to actuators 4-10 could be controlled, based on the type of application (for example type of object to be moved: in chess for example, there are smaller and larger pieces), and the desired speed of the motion. Fine control over the timing of the activation sequence of the actuators 4-10 could then effect acceleration, deceleration and speed control of the object. Similarly, an object trajectory resembling a curve or other shape could be achieved by a precise series of actuators 4-10 activations.

Also, a tactile sensation or tactile feedback may be provided to the user's finger at selected portions of the image display 4-1. According to an aspect of the present invention, using fine movement control of an image display according to the present invention, the user may feel little bumps of an image displayed, when touched. This can also be used for Braille output. In such an embodiment, blind people may use the image display for reading.

According to an aspect of the invention, the actuators 4-10 may also provide touch-sensitivity for the image display 4-1. For instance, a user's finger touching at the surface of the image display 4-1 would cause a movement of the actuators 4-10 which would cause the flow of current to be affected, for example, by causing current to flow. Such an arrangement of piezo-electronic materials will be well known to those skilled in the art. Accordingly, the actuators could provide an image display 4-10 with both tactile sensation and touch sensing.

Similarly with the other embodiments of the present invention, touch sensitivity could be provided. For example, a movement of a rod 2-10, or a movement of a ball bearing 1-10, caused by the user's finger (thumb, hand, et cetera) at the surface could sensed.

It will be appreciated that an image display according to the present invention could be made using a combination of the embodiments 1-4 described herein.

Embodiments of the present invention provided in the foregoing written description are intended merely as illustrative examples. It will be understood however, that the scope of the invention is provided in the claims.

The invention claimed is:

1. An image display comprising:
    a pixel array having a plurality of pixels, said plurality of pixels when selectively activated in response to a display signal forming a display image corresponding to the display signal; and
    an actuator matrix including a plurality of actuators interspersed between the plurality of pixels in said pixel array,
    wherein each of said actuators in said plurality of actuators comprises a plurality of conductive rods attached together, each rod of the actuator disposed to one of increase and decrease in size when current is applied to that rod to cause the actuator to bend toward a specified direction according to a received movement signal.

2. The image display as claimed in claim 1, wherein at least a portion of the pixel-actuator matrix is configured to move an object (3-2) at a surface of the image display in the specified direction.

3. The image display of claim 1, wherein each rod of the plurality of rods is comprised of piezo-electric ceramics.

4. The image display as claimed in claim 1, wherein each rod of the plurality of the rods is comprised of conductive polymers.

5. The image display of claim 1, wherein, according to the movement signal, a movement is provided at least one of the actuators to provide a haptic sensation and to impart motion to an object at the surface of said image display.

6. The image display of claim 1, wherein each of the actuators consists of three rods arranged such that responsive to application of a current to one or more of the three rods, the actuator bends toward one of at least four specifiable directions.

7. The image display of claim 1, wherein the actuator matrix provides touch sensitivity for the image display.

* * * * *